United States Patent [19]

Ansen et al.

[11] 4,193,554

[45] Mar. 18, 1980

[54] METHOD AND APPARATUS FOR THE DRYING AND FINE-GRINDING OF COAL

[75] Inventors: Jakob Ansen, Cologne; Horst Herchenbach, Troisdorf; Helmut Wustner, Cologne; Heinz Fasbender, Krefeld, all of Fed. Rep. of Germany

[73] Assignee: Klockner-Humboldt-Deutz AG, Fed. Rep. of Germany

[21] Appl. No.: 949,953

[22] Filed: Oct. 10, 1978

[30] Foreign Application Priority Data

Oct. 8, 1977 [DE] Fed. Rep. of Germany ....... 2745424

[51] Int. Cl.² ............................................ B02C 23/00
[52] U.S. Cl. ..................................... 241/19; 241/54; 241/59; 241/79.1

[58] Field of Search .................. 241/18, 19, 30, 54, 241/59, 79.1, 301

[56] References Cited

U.S. PATENT DOCUMENTS 3,599,885  8/1971  Alderman ..................... 241/19 X

*Primary Examiner*—Richard B. Lazarus
*Attorney, Agent, or Firm*—Hill, Van Santen, Steadman, Chiara & Simpson

[57] ABSTRACT

An apparatus and method for the safe preparation of pulverized coal comprises the steps of mixing coal with an inert gas in a pulverizing mill, separating dry coal dust from an exhaust gas bearing a residue of coal dust in a separator, mixing the exhaust gas with additional inert gas and filtering the coal dust from the gas mixture in a filter.

15 Claims, 1 Drawing Figure

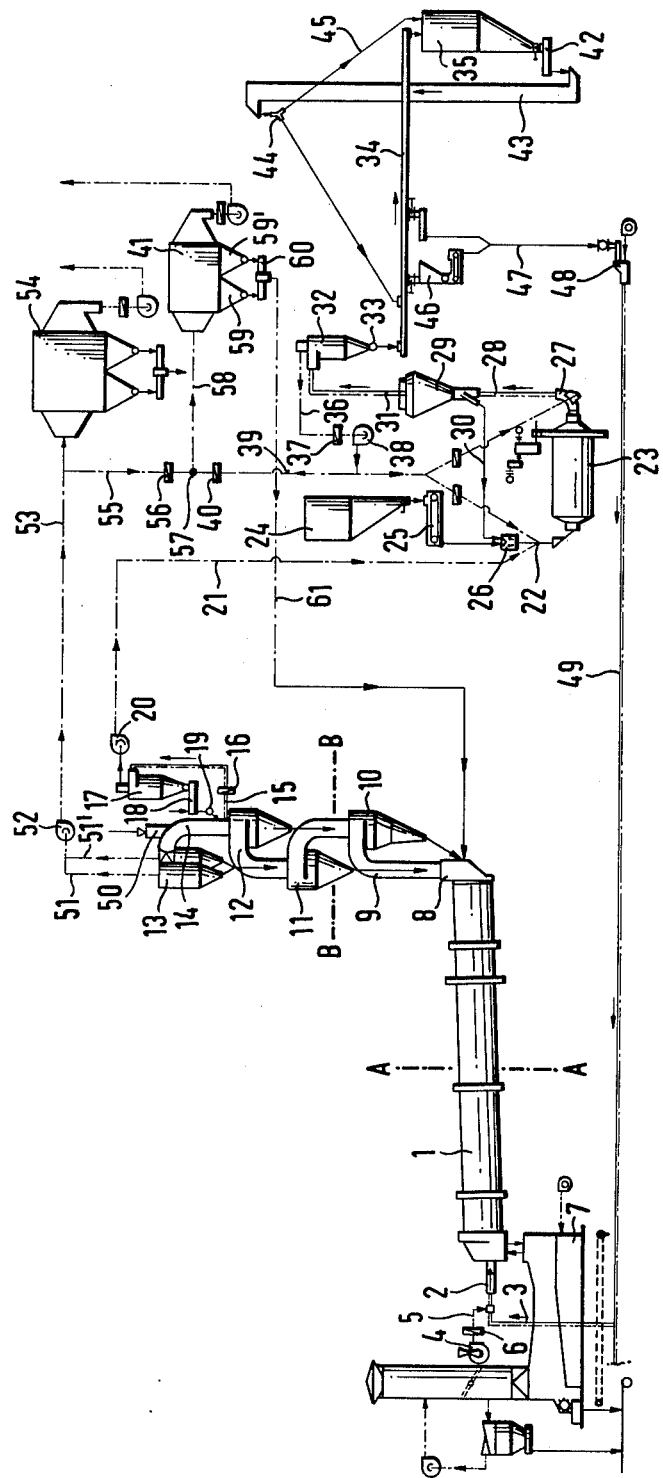

METHOD AND APPARATUS FOR THE DRYING AND FINE-GRINDING OF COAL

BACKGROUND OF THE INVENTION

1. Field of the Invention

The invention relates to a method as well as an apparatus for the drying and fine grinding of coal for the supply of coaldust-firing equipment to a calcination installation consisting of preheating stage, calcination stage and a sintering stage, particularly for the production of cement clinker.

2. The Prior Art

Experiences with, as well as the safety requirements for coal grinding installations, particularly for the production of coaldust for firing purposes, require above all with solid fuels with a relatively high content of volatile constituents, the reliable rendering inert of the entire grinding installations, or at least of the essential installation parts, mill, air separator and filter. Beyond this, the fluctuating moisture-content of the raw coal frequently occurring with peak values, require a high-tempered drying gas.

It was usual previously in many cases in the state of the art to select the placement of a grinding-drying installation for the supply of firing material to a cement installation, especially with very long rotary kilns, in the vicinity of the calcination platform, and to supply the same with hot exhaust air from the clinker-cooler system.

In this connection reference is made for example to the block circuit diagram on page 491 Zement, Kalk, Gips (ZKG), 1956, Vol. No. 11, in which such an installation is shown and described.

The known arrangement and the method practiced therewith are, however, limited in their recognized, uncomplicated adaptability thereby, that the mill-circulating gas is not inert, for which reason for example upon the processing of coal rich in gas, certain risks are not to be excluded. The preparation of such coals, rich in gas, requires, particularly with reference to these risks and in consideration of the current enhanced safety requirements with corresponding legal regulations, —a rendering inert of the grinding installation to as fargoing an extent as possible.

Furthermore, the question of the starting behavior of the entire installation plays a role insofar that from the ignition of the burner to the possibility of the removal of hot milling-gas from the clinker-cooler, a considerable time span passes by, which must be bridged over with the starting supply from a correspondingly large coaldust-supply bunker.

SUMMARY OF THE INVENTION

The invention is a method as well as an apparatus for the drying and fine grinding of coal for the supply of the coaldust for the firing of a calcination installation fulfilling the following criteria:

(a) the best possible fulfilling of high safety requirements, (b) Attainment of as great as possible economy as to heat and effective quality of the entire installation according to output.

(c) attainment of optimal conditions for the starting operation as well as for the regulation.

(d) optimal spatial and functional integration to a total-installation-entity.

These criteria are achieved with the invention whereby at least a partial stream [of a drying gas of sufficient degree of inertia and heat content,] obtained from the preheating stage and/or calcination stage, is conveyed by the shortest path to the grinding-drying apparatus.

Hereby results the advantage that the gas removal undertaken according to the teaching of the invention at this point has as a result an increase in output approximately corresponding to the relation of the quantity removed to the total quantity and not approximately a worsening of the specific heating content of the preheating stage.

The deflected gas contains on an average not more than 3 to 4% of free oxygen and approximately 28 to 34 percent by volume of $CO_2$, whereby it is quite inert in order to satisfy even the highest requirements with respect to operational safety of a grinding-drying-installation for coal. Beyond this, the gas possesses a temperature level of about 500° C. This is a sufficient heat content, in order to dry adequately relatively moist raw coal during the comminution.

In the preferred embodiment of the method, the inert gas is removed or taped from the penultimate or last stage of a multi-stage heat exchanger system forming the preheating stage.

Further advantages result with the invention in that the exhaust air of the grinding installation containing the coaldust, is mixed with additional inert exhaust gas from the preheating stage, containing mineral dust before the introduction into a filter. As a result, the exhaust-gas-atmosphere which had been rendered less inert through enrichment with coaldust and infiltrated air, is brought to a higher degree of inertness.

In a further embodiment of the method, the mixing relation of exhaust air to exhaust gas is so adjusted, according to the extent of the dust content, that the gas mixture contains approximately the same quantity portions of coaldust and mineral dust.

This adjustment of the mixture conditions, which is necessary for a definite degree of inertness is attained by adjusting the quantity portions of exhaust air to exhaust gas within sensible limits. The resultant gas mixture is conveyed to a filter independent of the dust-removal apparatus of the calcination installation.

From this results further essential advantages of the invention, thereby that the residue from the filter, the filtrate, consisting of a mixture of coaldust and mineral dust is introduced as additional fuel into the calcination stage. Thereby it is attained that the fuel coaldust contained in the filter residues, upon combustion, gives off heat at a point especially preselected for this purpose, namely, where the heat is required for the endothermic process of the calcination.

Corresponding to the criteria of the method according to the invention is an apparatus for carrying out the same, characterized in this, that the grinding-drying installation is arranged in the area of the preheating stage.

In development of the apparatus, the grinding-drying installation is integrated with the preheating stage functionally and/or spatially into an installation entity.

In this connection, the preheating stage has in its area on the exhaust gas side, a device for the removal of gas, which comprises a regulating member, a separator cyclone with gastight discharge-sluice-valve as well as a hot gas ventilator connected in series with the cyclone.

A further essential feature of the apparatus according to the invention consists therein, that the grinding-drying-installation is equipped with a filter functionally independent of the dust removal devices of the calcination installation, advantageously an electrofilter.

On account of the rendering inert of the grinding-drying-installation attained with the inert gas, a normal type filter not explosion or fireproof may be used.

In this connection, this filter according to the teaching of the invention, is so dimensioned that it takes up for at least each 50% of its output yield both the mill-exhaust air as well as also a corresponding quantity of exhaust gas from the preheating stage.

The independence in function and regulation behavior of the two filters is attained thereby, that the filter of the grinding-drying-installation is connected parallel with the exhaust gas filter of the preheating stage.

And finally in development of the apparatus, there is attached to the discharge apparatus of the filter of the grinding-drying-installation, a conveyor device, advantageously a drop-conduit which for the introduction of the dust-removal product in the calcination stage discharges into the same.

In this connection there results the accurate localization of the inlet or entry of the additional calcination material in the calcination stage, both directly in the area of the furnace inlet as well as also for example in the connecting conduit between rotary kiln and heat exchanger system, or as the case may be, in a so-called Pyrocolone or at other suitable points of the calcination stage. A further advantage of the invention results in that the filter residue, on account of its composition of coal dust and heat exchanger dust in the ratio of 1:1, represents a mixture not dangerous to handle. If first becomes ignitable upon being heated to temperatures above the coal-gasification point and upon feeding oxygen.

The calcination installation supplies heated, essentially inert gas bearing mineral dust for the inventive method and apparatus. The method comprises the steps of mixing the coal to be pulverizing the coal, separating the pulverized coal into dry coaldust and an exhaust gas carrying a residue of coaldust, mixing the exhaust gas with a part of the inert gas to make the coaldust bearing exhaust gas substantially less combustible, filtering the coaldust from the resultant mixed gas, supplying the filter residue, or filtrate, composed of the coaldust and the mineral dust removed from the mixed gas to the calcination stage as additional fuel. In the inventive method, the step of mixing the exhaust gas may include the requirement of mixing the exhaust gas such that the filtrate is composed of essentially equal parts of mineral dust and coaldust.

The inventive apparatus for practicing the method comprises a means for supplying coal to be pulverized, a means for mixing the coal with a part of the inert gas, means for pulverizing the coal mixed with the inert gas, means for separating pulverized coal into coaldust and an exhaust gas containing a residue of coaldust, means for mixing a part of the inert gas with the exhaust gas thereby making the exhaust gas substantially less inert, means for filtering the coaldust and the mineral dust from the mixture of inert gas and exhaust gas, and means for supplying the filtrate from said means for filtering to the calcination apparatus as additional fuel. The means for separating may include an air current separator and a cyclone separator operably connected together. The means for mixing the exhaust gas with the inert gas includes control means for adjusting the proportions of inert and exhaust gas so that the filtrate is composed of substantially equal parts by weight of coaldust and mineral dust.

BRIEF DESCRIPTION OF THE DRAWING

FIG. 1 is a block diagram of a calcination apparatus incorporating the inventive coal pulverizing system.

DETAILED DESCRIPTION OF THE PREFERRED EMBODIMENT

While the apparatus of the present invention finds a particular utility for the production of coaldust, the present apparatus might be utilized in other combinations. By way of disclosing the best mode of practicing the invention and not by way of limitation, there is shown generally in FIG. 1 a block diagram of a calcination installation for the production of cement clinker with the inventive air-current installation for the supply of coaldust.

The installation has a rotary kiln 1, whose burner 2 is supplied with coaldust from a conduit 3 as well as with primary air from a blower 4 with a conduit 5 and a throttle member 6. Connected in series with the furnace 1 on the product side is a clinker-cooler 7, whose cooling air is ordinarily introduced as hot secondary air wholly or preponderantly into the rotary kiln 1. At the other end of the rotary kiln 1 is located a furnace inlet 8, to which is attached an exhaust gas conduit 9. The conduit 9 discharges tangentially into a first cyclone 10 of the heat exchanger system. Thereupon follow heat exchanger stages, two, three and four, 11, 12 and 13, which represent together with the rotary kiln 1, the calcination installation. In this connection, in the present installation by way of example, the cyclones 13, 12, 11 of the heat exchanger system form the preheating stage, while the calcination stage comprises the area between the section line B—B and A—A, that is, the heat exchanger cyclone 10 as well as the part of the rotary kiln 1 between furnace inlet 8 and approximately the furnace center.

The sintering stage extends approximately from the section line A—A to the radiation zone of the flame in the burner 2.

The heat exchanger cyclones 12 and 13 are connected by means of a conduit 14. At the lower end of the conduit 14 is attached a gas removal apparatus, for the grinding-drying-installation, which comprises a conduit 15 with a throttle member 16, a separator cyclone 17 with a discharge worm 18 and a bucket-wheel charging valve 19 as well as a hot gas ventilator 20. Gas removed at this point has a temperature level of about 500° C. It contains about 3 to 4% free oxygen and about 28 to 32% $CO_2$. In this condition, the gas both from the standpoint of being inert as well as also from the standpoint of the heat content is best adapted for the introduction into the air-current-grinding installation.

From the hot gas-ventilator 20, a gas conduit 21 leads to a charging side 22 of a tube mill 23.

The gas-current-drying and grinding-installation shown and described in the present example comprises furthermore a raw-coal bunker 24 with a regulating or dosaging discharge member 25, which charges raw coal through a gastight double-input valve 26 into the charger 22 of the tube mill 23. A discharge side 27 of the tube mill 23 has connected thereto a vertical shaft 28 which discharges into a first or air current separator 29. The separator 29 separates finished product and gravel.

The gravel parts at a gravel output port 29' are guided back with a conveyor device 30 to the double input valve 26. The finished product coaldust is output at an exhaust port 30' connected to a pure-gas-conduit 31 into a second separator 32. The second separator, a cyclone separator, 32 separates coaldust from the mill-exhaust-air. The coaldust drops through a gastight valve 33 onto a conveyor device 34 and into a coaldust bunker 35.

The mill-exhaust air output at an exhaust port 32' of the second separator 32, laden with a residue of coaldust, is supplied through a conduit 36 with a regulating member 37 to the suction side of a ventilator 38.

From the ventilator 38 leads a connecting conduit 39 with a regulating member 40 to a conduit 58 and then to a separate electro-filter 41 for the grinding-drying-installation. The output side of the ventilator 38 may also be connected to the inlet 22 and/or the outflow 27 of the mill 23 if desirable for grinding.

The coal-dust bunker 35 is, as known per se, equipped with a rotating or circulating device which comprises a regulating or dosaging member 42, an elevator 43, a material-separator 44 as well as a return conduit 45. The conveyor device 34 is equipped with a regulated withdrawal-device 46, which supplies the coaldust in the desired adjustable quantity/time through a conduit 47 to a dust conveyor member 48. The latter feeds the coaldust by means of conveyor air through the conduits 49, 3 to the burner 2 of the rotary kiln 1.

The preheating stage, as already explained, consisting of the heat exchanger cyclones 11, 12, 13 has as its exhaust gas side end a material charge 50 for the mineral-pulverized raw material, and further, a pair of exhaust gas conduits 51, 51' which are attached in common to the suction side of an exhaust gas ventilator 52. The latter feeds the exhaust gas of the calcination installation through a conduit 53 to an electrofilter 54 pertaining to the calcination installation. From the conduit 53, a gas-conduit 55 branches off, which is equipped with a regulating member 56. At the connection point 57 the pipe conduits 55 and 39 combine to the common exhaust gas conduit 58, which discharges into the electrofilter 41 for with the grinding-drying-installation; this connection brings with it the further advantage that the filter 41 relieves the parallel exhaust gas filter 54 of a certain amount of gas flow and mineral dust.

At the collection tips 59, 59' of the electrofilter 41 is attached a discharge worm 60, which guides back the dust removal product with a drop-circuit conveyor 61 to the furnace inlet 8 of the rotary kiln 1.

The dust removal product, or filtrate, which according to the measure of the dust content of the partial streams of mill-exhaust-air and calcination installation exhaust gas supplied to the electrofilter 41 is so controlled that it contains on an average, 50 percent by weight of mineral dust and 50 percent by weight of coaldust, is charged with a temperature of about 100° C. into the furnace inlet 8, which has a temperature level between circa 800° C. to 1100° C. The filtrate reacts spontaneously with the free oxygen from the atmosphere of the furnace 1, on account of the heating, in sudden bursts.

The installation shown purely diagrammatically as a block circuit diagram, shows the essential features of the invention which consist therein, that the grinding drying installation is integrated with the preheating stage 11, 12, 13 of the calcination installation functionally and spatially into an installation entity. This is attained thereby, that the tap for the drying gas is attached to the penultimate cyclone stage 12 and is guided on the shortest path with the conduit 21 to the grinding device 23 of the grinding-drying installation. In this connection, the conduit 21 provided is a so-called drop conduit. That is, with steep drops on the shortest path to the mill 23, so that at no point of the conduit can deposits of dust form.

A further functional integration integration between the calcination installation and grinding drying installation results with the furnishing of the connection of both installations on the exhaust gas side with the conduits 39 and 55. Hereby it is attained that themill exhaust air, which through fresh-air introduction as well as admixture of volatile constituents of the coal and loading with finest particles of coaldust has at least partially lost its characteristic of rendering inert, is rendered inert again through admixture as desired of exhaust gas from the calcination installation. This brings with it the further advantage that the electrofilter 41 of the grinding installation may have a normal construction instead of an embodiment which is fireproof or protected against explosion, which would cause extraordinarily high investment costs corresponding to the special type of construction.

Through the mixture already mentioned of the gases from the calcination installation and mill there results beyond this the still further advantage, that the dust removed by the filter 41 may be controlled as desired in its composition. For example, a mixture preferably results which is not dangerous to handle, of 1:1 of coal-dust and mineral dust. The combustion of this mixture influences favorably the thermal degree of effectiveness of the calcination installation in the area of the preheating stage of the calcination stage.

Thereby, simultaneously the blower 52 of the preheating stage as well as the electrofilter 54 is relieved, whereby in toto, also the output-capacity of the installation is improved.

Finally, there result for an installation according to the invention also still especially favorable conditions upon starting. A short time after the ignition of the burner, the installation is brought relatively rapidly to operating temperature with careful charging of pulverized raw material. A short time later, then in the pipe conduit 14, exhaust gas in sufficient quantity with the required temperature as well as with the required content of $CO_2$ is available, in order subsequently also to be able to set in motion the grinding-drying-installation.

For this purpose, first with closed regulating member 40 and open regulating member 56, by means of the conduits 53, 55, 58, the electro-filter 41 is flooded with inert gas. At the same time or subsequently, also the mill circulation of the grinding installation may be flooded with inert gas, before the raw coal is delivered.

Through the correlation as close as possible spatially of the grinding-drying-installation with the calcination installation and expecially with its heat-exchanger system, the further shortest possible connecting pipe-conduits 21, 53, 55, 58 as well as the shortest transporting stretches 61 are attained. From this results the advantage that these conduits may be carried out at least for the greatest part as drop-conduits, whereby dangerous and/or harmful deposits there are prevented as far as possible.

The block-circuit diagram shown in the drawing and explained in the foregoing—of an installation by way of example for the invention, may be modified to a fargoing extent while maintaining the features essential to the invention. For example, the air-stream-grinding installation may be equipped with desired comminution or crushing machines, such as beater-, impact- or hammer-mills. Instead of electrofilters, other filter types may be used. Finally, various points for the removal of the drying gas as well as for the introduction of the dust-removing gas according to the specific lay-outs of each installation are imaginable within the limits fulfilling the fundamental conditions and therefore allowable within the framework of the invention.

While modifications or changes may be proposed by those skilled in the art, it will be understood that I wish to embody within the claims of the patent warranted hereon, all such modifications and changes as reasonably falls within my contribution to the art.

We claim as our invention:

1. A method for the drying and pulverizing of coal for the supply of coaldust for the firing of a related installation which supplies a heated, essentially inert, gas bearing mineral dust to the pulverizing apparatus comprising the steps of:
   mixing the coal with a part of the inert gas
   pulverizing the coal
   separating the pulverized coal into dry coaldust and an exhaust gas carrying a residue of coal dust
   mixing a part of the exhaust gas with a part of the inert gas to make the coal dust bearing exhaust gas substantially less combustable
   filtering the coal dust from the resultant mixed gas
   supplying the filter residue, the coal dust removed from the mixed gas, to the related installation as additional fuel.

2. The method according to claim 1, wherein the step of separating includes separating coal gravel from the coal dust and exhaust gas and the method of claim 1 has the furtherstep of injecting the gravel into the mixture of coal and inert gas.

3. The method according to claim 1 wherein the step of filtering results in a filtrate of essentially equal parts of mineral dust and coal dust.

4. The method according to claim 1 having the further step of injecting a part of the exhaust gas into the mixture of coal and inert gas.

5. Apparatus for the safe production of coal dust for use in a calcination apparatus, capable of supplying a stream of substantially inert gas which contains a quantity of mineral dust, comprising:
   means for supplying coal to be pulverized,
   means for mixing a part of the inert gas with the coal to be pulverized,
   means for pulverizing coal mixed with the gas,
   means for separating pulverized coal into coal dust and an exhaust gas containing a residue of coal dust,
   means for mixing a part of the inert gas with the exhaust gas thereby making the exhaust gas substantially less combustible,
   means for filtering the coal dust from the mixture of insert gas and exhaust gas,
   means for supplying the filtrate from said means for filtering to the calcination apparatus as additional fuel.

6. The apparatus according to claim 5 wherein said means for mixing the inert gas and coal to be pulverized comprises:
   a conduit with a regulator means connected to a selected point on the related apparatus,
   a separator operably connected to said conduit having as an output the stream of substantially inert gas to be injected into said means for pulverizing.

7. The apparatus according to claim 5 wherein said means for filtering comprises an electro-filter.

8. The apparatus according to claim 5 wherein said means for mixing the inert gas and the exhaust gas includes control means for adjusting the proportions of inert and exhaust gas so that the filtrate is composed of substantially equal parts by weight of coal dust and mineral dust.

9. The apparatus according to claim 5 wherein said means for supplying the filtrate comprise:
   a drop-conduit conveyor.

10. Apparatus for supplying pulverized coal dust to a calcination installation comprising:
    a first input conduit for supplying a stream of substantially inert gas at a first predetermined temperature,
    a source of coal with an output port operable to supply a regulated stream of coal to be pulverized,
    a pulverizing mill having an input port and an output port with said input port having a junction member operably connected to said input conduit and said output port of said source of coal,
    a means for separating with an input port connected to said output port of said mill and operable to separate a stream of pulverized coal dust and coal gravel generated within said mill into a stream of coal gravel at a gravel output port, a stream of coal dust at a dust output port and a stream of exhaust gas bearing a residue of coal dust at an exhaust gas output port,
    means for mixing at least a part of the stream of exhaust gas with a stream of inert gas at a second predetermined temperature operably connected to said exhaust gas port of said means for separating and to a second input conduit for supplying the stream of inert gas at the second predetermined temperature,
    a filter with an input port and an output port with said input port of said filter connected to said means for mixing and operable to receive a mixed gas stream composed of exhaust gas bearing coal dust and inert gas at the second predetermined temperature,
    an output conduit connected to said output port of said filter operable to deliver a filtrate from said filter to the calcination installation.

11. The apparatus according to claim 10 wherein said gravel output port of said means for separating has a gravel delivery conduit and a control means connected thereto,
    said gravel delivery conduit and said control means also being operably connected to said input port of said pulverizing mill whereby the gravel stream may be returned to said pulverizing mill.

12. The apparatus according to claim 10 wherein at least one stream of inert gas bears a predetermined amount of mineral dust and said means for mixing is adjusted so that the filtrate removed from said filter is 50% by weight of coal dust and 50% by weight of mineral dust.

13. The apparatus according to claim 12 wherein said first and said second input conduits and said output conduit are selected to be minimal length drop conduits whereby the possibility of dangerous dust collection is minimized.

14. The apparatus according to claim 10 wherein said first and second input conduits, said pulverizing mill, said separating means, said mixing means, said filter, said output conduit and all of said interconnections form a sealed system wherein the entry of atmospheric gas is minimized and wherein the inertness of the gases in said closed system is maximized to minimize danger of explosion and/or fire.

15. The apparatus according to claim 14 wherein said filter is an electro-filter of ordinary construction not fireproof or explosion proof.